United States Patent [19]

Bernard Glance

[11] Patent Number: 4,697,284

[45] Date of Patent: Sep. 29, 1987

[54] SINGLE-PHOTODIODE OPTICAL HETERODYNE MIXERS

[75] Inventor: Bernard Glance, Colts Neck, N.J.

[73] Assignee: American Telephone and Telegraph Company, AT&T Bell Laboratories, Murray Hill, N.J.

[21] Appl. No.: 860,822

[22] Filed: May 8, 1986

[51] Int. Cl.[4] .............................................. H04B 9/00
[52] U.S. Cl. ................................................... 455/619
[58] Field of Search ............... 455/609, 616, 617, 619; 370/2; 329/144; 356/349, 351

[56] References Cited

U.S. PATENT DOCUMENTS

| 3,215,840 | 11/1965 | Buhrer | 250/199 |
| 3,636,356 | 1/1972 | Giordmaine | 455/619 |
| 3,975,628 | 8/1976 | Graves et al. | 250/199 |

OTHER PUBLICATIONS

Pratt, Laser Communications Systems, J. Wiley & Sons, 1969, pp. 38-40, 183-190, 224-231.
Wrixon, 8th European Microwave Conf., Paris, France, 4-8 Sep., 1978, pp. 717-719.
Bachus et al., Electronic Let., vol. 19, No. 17, 18, Aug., 1983, pp. 671-672.
Abbas et al., Globecom '83, San Diego, Calif., Nov. 28-Dec. 1, 1983, vol. 1, pp. 12.5.1-12.5.6.
Shikada et al., Trans, IECE, Japan, vol. E67, No. 6, Jun. 1984, pp. 337-338.
Nicholson, Electronic Let., vol. 20, No. 24, Nov. 22, 1984, pp. 1005-1007.

*Primary Examiner*—Joseph A. Orsino, Jr.
*Attorney, Agent, or Firm*—Erwin W. Pfeifle

[57] ABSTRACT

The present invention relates to a single-photodiode optical mixer for heterodyne detection of optical signals. In the present optical mixer, a received optical signal and an optical local oscillator signal, which are each polarized along one direction of a polarizing beam-splitter, are directed at a 3 dB beam-splitter. Equal portions of the received signal and local oscillator signal are directed along first and second paths by the beam-splitter for arrival at a polarizing beam-splitter. One of the paths between the two beam-splitters comprises a 90 degree polarization rotator for rotating the polarization of the signal passing therethrough by $\pi/2$ radians. The output from the polarizing beam-splitter comprises the signal from the first path including a first polarization direction and the signal from the second path including a second polarization direction, which two signals are detected independently by a single photodetector to generate an IF signal which is the sum of the two IF currents.

8 Claims, 4 Drawing Figures

SINGLE-PHOTODIODE OPTICAL HETERODYNE MIXERS

TECHNICAL FIELD

The present invention relates to single-photodiode optical heterodyne mixers and, more particularly, to single-photodiode optical heterodyne mixers which provide the same performance as known two-photodiode balanced optical heterodyne mixers.

DESCRIPTION OF THE PRIOR ART

Optical heterodyne receiver mixers function to combine an incoming optical signal with an optical signal from a local laser to produce an output signal whose frequency is equal to the frequency difference of the two optical signals. The simplest known optical mixer configuration is disclosed in, for example, the book "Laser Communication Systems" by W. K. Pratt, John Wiley & Sons, Inc., 1969, and is shown in FIG. 2. In the mixer of FIG. 2, a received optical signal from a remote source propagating along path 10, and an optical local oscillator signal propagating normal to path 10 along path 11 impinge on an optical beam-splitter 12. Each of the two optical outputs of beam-splitter 12 comprises selected portions of the received and local oscillator signals from paths 10 and 11, respectively, which propagate along paths 13 and 14. One of the two optical outputs from beam splitter 12, which for purposes of illustration will be the output on path 13, is directed to a photodetector 15. Since the signals propagating on path 14 are wasted, only a fraction of both the received signal and the local oscillator signal is available for detection with this arrangement. Usually, the receiver sensitivity is maximized by using a beam-splitter which transmits most of the received signal. Most of the local oscillator signal is then wasted in the unused output of beam splitter 12, and, therefore, a high power source is required for the local oscillator signal to obtain a receiver performance limited by quantum noise.

A more efficient mixing is provided by a balanced-mixer configuration disclosed, for example, in FIG. 3 of the article by G. L. Abbes et al. in the *Globecom '83* Conference Record, Vol. 1 at pages 12.5.1–15.5.6, and shown in FIG. 3. In FIG. 3, the basic elements 10–15 of FIG. 2 are shown and function as described hereinabove. The signals propagating along path 14, however, are reflected by a mirror 16 to a second photodetector 17. The electrical output signals from photodetectors 15 and 17 are provided as inputs to a differential amplifier 18 to generate the mixer output signal. In such arrangement, the received signal and the local oscillator signal are both divided equally by beam-splitter 12 into two beams propagating along paths 13 and 14, each directed to a separate photodetector 15 and 17, respectively. Addition of the currents provided by the two photodetectors through differential amplifier 18 yields a detected signal proportional to the available power in the two optical signals.

Although the balanced mixer design uses all the available power, it requires an additional photodetector 17 and differential amplifier 18. The problem remaining in the prior art is to provide a mixer of simpler design which uses all of the available power of the received and local oscillator signal as in the balanced mixer.

SUMMARY OF THE INVENTION

The foregoing problem in the prior art has been solved in accordance with the present invention which relates to single-photodiode optical heterodyne mixers which mix received optical and local oscillator signals for detection by the single photodiode where the two signals are linearly polarized along the direction of one of the polarization axes of a polarizing beam-splitter. The present mixers provide the same performance of the known balanced optical heterodyne mixer.

It is an aspect of the present invention to provide a single-photodiode optical heterodyne mixer which includes a 3 dB beam-splitter for directing optical polarized received and local oscillator signals along a first and a second path, where one of the paths includes a 90 degree polarization rotator. Both paths from the beam splitter arrive at a polarizing beam splitter which directs the appropriate orthogonal signals from the two paths to a photodetector diode.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
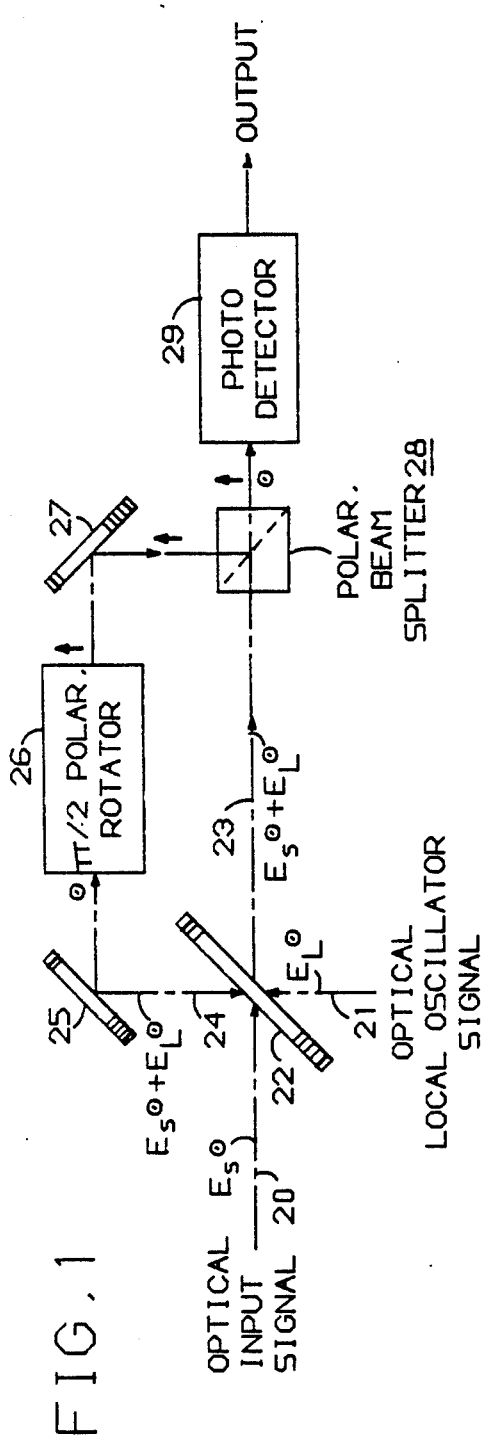
FIG. 1 is a diagram of the single-photodiode optical heterodyne mixer in accordance with the present invention.
Figure 2:
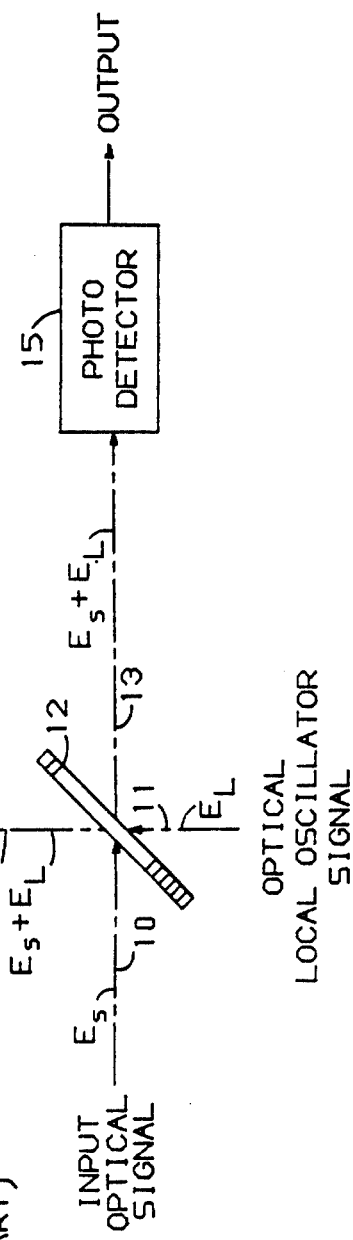
FIG. 2 is a diagram of a single-diode optical mixer known in the prior art.

FIG. 1 is a diagram of a single-photodiode optical heterodyne mixer in accordance with the present invention. A first input to the mixer is an optical input signal $E_s$ such as, for example, a signal received from a remote transmitter which is directed along a first path 20 and can be represented by the equation $$E_s(t) = \sqrt{2P_s} \cos[\omega_s t + \theta_s(t)] \quad (1)$$

where $P_s$ is the signal power, $\omega_s$ is the radial frequency and $\theta_s(t)$ is the phase noise. A second input to the mixer is an optical local oscillator signal $E_L$ which can be represented by the equation $$E_L(t) = \sqrt{2P_L} \cos[\omega_L t + \theta_L(t)] \quad (2)$$

where $P_L$, $\omega_L$, and $\theta_L(t)$ are similar quantities to those shown in Equation (1), and the local oscillator signal is directed along a second path 21 which is shown substantially orthogonal to first path 20. Both paths 20 and 21 intersect at substantially the center of a 3 dB beam-splitter 22. Beam-splitter 22 functions to add the optical input signal $E_s$ and the optical local oscillator signal $E_L$ while concurrently dividing the combined signals in equal parts for direction along a substantially orthogonal first and second beam-splitter output paths 23 and 24, respectively.

For purposes of illustration, it will be assumed in FIG. 1 that both the received optical input signal $E_s$ and the optical local oscillator signal $E_L$ are each horizontally polarized. The horizontal polarization is illustrated in FIG. 1 by a dot surrounded by a circle adjacent each of paths 20, 21, 23 and 24. The output signals from beam-splitter 22 along each of paths 23 and 24, therefore, include the horizontally polarized equal parts of the combined input signals $E_s + E_L$.

The combined signal directed along path 24 from beam-splitter 22 impinges on a first mirror 25 which redirects the combined signal to a $\pi/2$ polarization rotator 26 which functions to change the horizontally polarized combined signal $E_s + E_L$ into vertically polarized combined signals which are represented by the upwards arrow in path 24 after rotator 26. The output from polarization rotator 26 is directed at a second mirror 27 which re-directs the vertically polarized combined signals to a polarizing beam-splitter 28. The unchanged horizontally polarized combined signals propagating along path 23 are also directed at polarizing beam-splitter 28 and arrived substantially orthogonal to the redirected path 24. The horizontally polarized combined signals propagating along path 23 are aligned with the horizontal polarization axis of polarizing beam-splitter 28 and, therefore, traverse through beam-splitter 28 unaffected and impinge on a photodetector 29 disposed in their path. Concurrent therewith, the vertically polarized combined signals propagating along path 24 arrive orthogonal to the horizontal polarization axis of polarizing beam-splitter 28 and, therefore, are reflected by beam splitter 28 to also impinge on photodetector 29. In FIG. 1, the dot in a circle after beam-splitter 28 represents the horizontally polarized combined signals from path 23, while the upwards arrow after beam-splitter 28 represents the vertically polarized combined signals from path 24 which both impinge on photodetector 29.

The horizontally polarized combined signals seen by photodetector 29 from path 23 is given by $$E_H = \sqrt{P_s} \cos\left[\omega_s\left(t + \frac{L_1}{v}\right) + \theta_s\left(t + \frac{L_1}{v}\right) + \theta_T + \theta'_T\right] + \sqrt{P_L} \cos\left[\omega_L\left(t + \frac{L_1}{v}\right) + \theta_L\left(t + \frac{L_1}{v}\right) + \theta_R + \theta'_T\right] \quad (3)$$

where the notation H indicates that the signal is horizontally polarized, $L_1/v$ is the path delay, $\theta_T$ is the phase shift of the received signal traversing through the 3 dB beam-splitter 22, $\theta'_T$ is the similar quantity produced by the polarizing beam-splitter 28, and $\theta_R$ is the phase shift of the local oscillator signal caused by the reflection of beam-splitter 22. The phase shift $\theta_T$ and $\theta_R$ are related by $$\theta_T - \theta_R = \frac{\pi}{2}. \quad (4)$$

The polarization of path 24 is rotated by $\pi/2$ radians by means of polarization rotator 26. The resulting signals are then directed to polarizing beam-splitter 28. Being vertically polarized, these signals are reflected by the polarizing beam-splitter 28 coaxially into the beam of the horizontally polarized signals from path 23. The vertically polarized combined signals seen by photodetector 29 is given by $$E_V(t) = \sqrt{P_s} \cos\left[\omega_s\left(t + \frac{L_2}{v}\right) + \theta_s\left(t + \frac{L_2}{v}\right) + \theta_R + \theta'_R\right] + \sqrt{P_L} \cos\left[\omega_2\left(t + \frac{L_2}{v}\right) + \theta_L\left(t + \frac{L_2}{v}\right) \theta_T + \theta'_R\right] \quad (5)$$

where the notation V indicates that the signal is vertically polarized, $L_2/v$ is the path delay and $\theta'_R$, is the phase shift caused by the reflection of polarizing beam-splitter 28 on the signals. The signals illustrated by Equations (3) and (5), being orthogonally polarized, are detected independently by photodetector 29. Thus, the photodetector 29 current is the sum of the two IF currents $I_1$ and $I_2$ given by $$I_1 = \frac{2\pi\eta e \sqrt{P_s P_L}}{h\omega} \cos\left[\Omega\left(t + \frac{L_1}{v}\right) + \theta_s\left(t + \frac{L_1}{v}\right) - \theta_L\left(t + \frac{L_1}{v}\right) + \frac{\pi}{2}\right] \quad (6)$$

and $$I_2 = \frac{2\pi\eta e \sqrt{P_s P_L}}{h\omega} \cos\left[\Omega\left(t + \frac{L_2}{v}\right) + \theta_s\left(t + \frac{L_2}{v}\right) - \theta_L\left(t + \frac{L_2}{v}\right) - \frac{\pi}{2}\right] \quad (7)$$

where $\Omega = \omega_s - \omega_L$ is the IF frequency, $\eta$ is the quantum efficiency of the photodiode in detector 29, e is the charge of the electron, h is Planck's constant, and $\omega$ is the optical radial frequency. The photodiode current $I_1 + I_2$ is equal to zero when $L_1 = L_2$ because of the phase shift introduced by 3 dB beam-splitter 22. This phase shift can be canceled by selecting $L_2$ and $L_1$ such that $$\frac{\Omega(L_2 - L_1)}{v} = \pi. \quad (8)$$

In this case the photodiode current of detector 29 is $$I = \frac{4\pi\eta e}{h\omega} \sqrt{P_s P_L} \cos \Delta\theta(t) \cos \Omega\left(t + \frac{L_1 + L_2}{2v}\right) + \theta_s\left(t + \frac{L_1}{v}\right) + \theta_s\left(t + \frac{L_2}{v}\right) - \quad (9)$$

-continued $$\theta_L\left(t + \frac{L_1}{v}\right) - \theta_L\left(t + \frac{L_2}{v}\right)$$

where $$\Delta\theta(t) = \frac{1}{2} \theta_s\left(t + \frac{L_1}{v}\right) - \theta_s\left(t + \frac{L_2}{v}\right) - \quad (10)$$

$$\theta_L\left(t + \frac{L_1}{v}\right) - \theta_L\left(t + \frac{L_2}{v}\right)$$

This quantity is equal to the phase difference of the phase noise measured over one half cycle of the IF frequency $\Omega$. For a received signal and a local signal having the same 3 db linewidth, $\Delta F_{3db}$, $\Delta\theta$ is a random gaussian variable of zero-mean and mean square deviation given by $$\overline{\Delta\theta^2} = 2\pi\Delta F_{3dB} T_{IF}; \ T_{IF} = \frac{2\pi}{\Omega}. \quad (11)$$

For DPSK signals, transmitted at a bit rate 1/T, the value $\Delta F_{3db}T$ needed to obtain a BER of $10^{-9}$ with a penalty of less or equal to one dB is given by $$\Delta F_{3dB}T \leq \frac{1}{300}. \quad (12)$$

Substituting Equation (12) into Equation (11) yields $$\overline{\Delta\theta^2} \leq \frac{2\pi}{300} \cdot \frac{T_{IF}}{T}. \quad (13)$$

where the IF period $T_{IF}$ must be several times smaller than the bit rate T. For example, if $$\frac{T}{T_{IF}} = 5,$$

then $$\sqrt{\overline{\Delta\theta^2}} \leq 3.7$$

degrees and thus cos $\Delta\theta(t) \approx 1$ in Equation (9). One can thus write that $$I \approx \frac{4\pi\eta e}{\hbar\omega} \sqrt{P_s P_L} \cos\left\{\Omega\left(t + \frac{L_1 + L_2}{v}\right) + \frac{\theta_s\left(t + \frac{L_1}{v}\right) + \theta_s\left(t + \frac{L_2}{v}\right) - \theta_L\left(t + \frac{L_1}{v}\right) - \theta_L\left(t + \frac{L_2}{v}\right)}{2}\right\} \quad (14)$$

Figure 3:
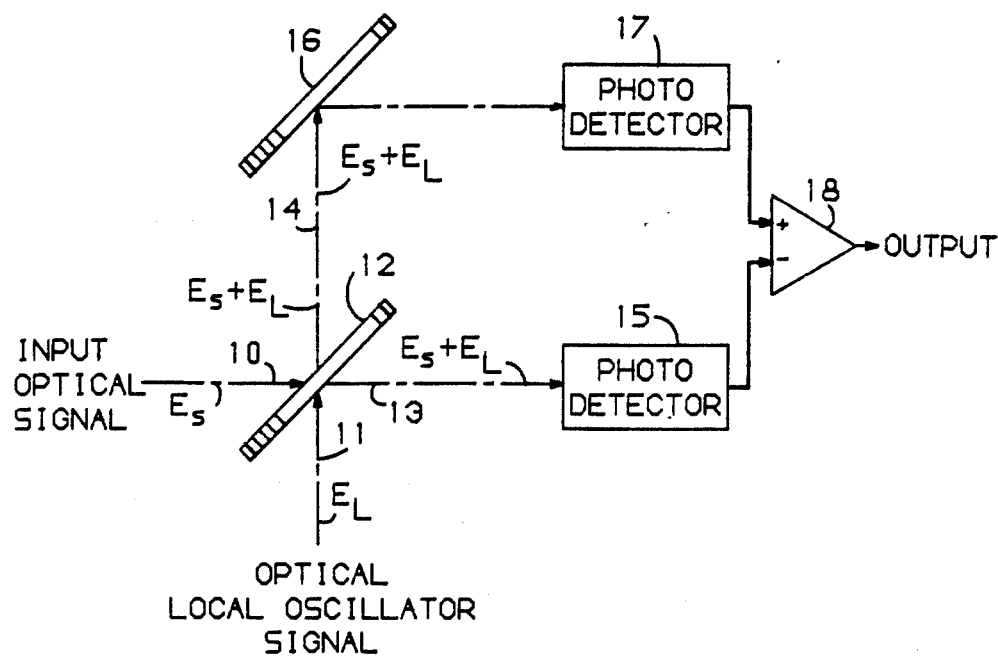
FIG. 3 is a diagram of a balanced optical mixer known in the prior art.
Figure 4:
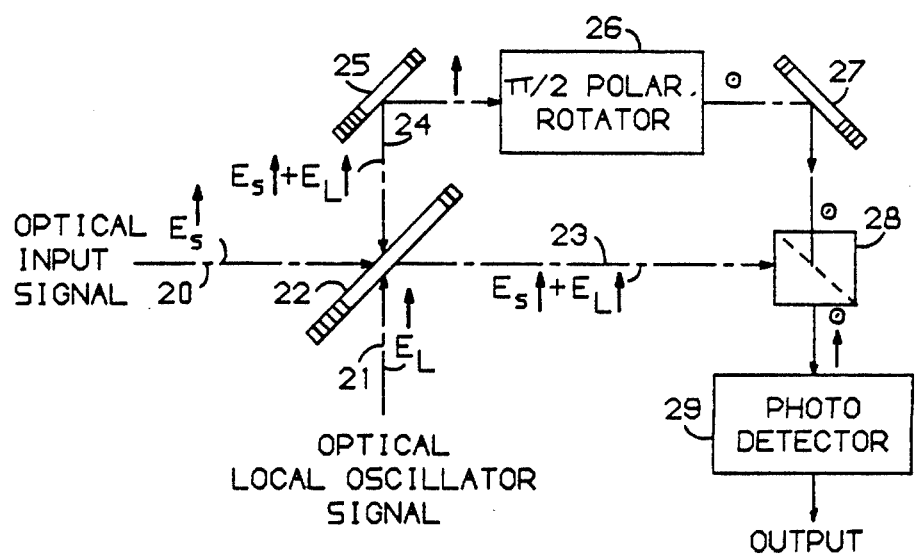
FIG. 4 is a diagram of a single-photodiode optical heterodyne mixer similar to the arrangement of FIG. 1 for signals which include polarizations orthogonal to those shown in FIG. 1.

FIG. 4 is a diagram similar to the arrangement of FIG. 1 except that the input optical signal $E_s$ and the local oscillator signal $E_L$ are vertically polarized instead of being horizontally polarized as shown in FIG. 1. The prior discussion similarly applies to elements 20–29 of the arrangement of FIG. 4, except that photodetector 29 is relocated to receive the reflected signals from path 23 and the signals which traverse through polarizing beam-splitter 28 from path 24. In either arrangement, of FIG. 1 or 4, the optical mixer shown is capable of the heterodyne detection of optical signals. The mixer uses a single photodetector 29 to provide the same performance as found with conventional balanced mixers using two photodetectors as shown in FIG. 3.

It is to be understood that the above-described embodiments are simply illustrative of the principles of the invention. Various other modifications and changes may be made by those skilled in the art which will embody the principles of the invention and fall within the spirit and scope thereof. For example, the 3 dB beam splitter 22 can comprise any suitable device such, as for example, an optical coupling device which will provide the combination and splitting of the input and local oscillator signals for proparation along paths 23 and 24. Similarly, other suitable devices can be substituted for those specified and described hereinbefore which will provide the functions described. Additionally, the $\pi/2$ polarization rotator can be included in path 23, rather than path 24, to rotate the combined signal portion therein rather than the combined signal portion propagating in path 24. In such arrangement, photodetector 29 in FIG. 1 would have to be disposed as shown in FIG. 4, and the photodetector 29 in FIG. 4 would have to be disposed as shown in FIG. 1 to properly receive the coaxially aligned signal portions at the output of polarizing beam-splitter 28.

What is claimed is:

1. An optical heterodyne mixer comprising:
    a first and a second input terminal for receiving an optical signal and an optical local oscillator signal, respectively, each optical signal comprising a same direction of polarization;
    means for both (a) combining the signals received at the first and second input terminals and (b) directing first and second substantially equal portions of the combined signals along first and second output paths, respectively;
    means disposed in one of the output paths from the combining and directing means for rotating the direction of polarization of the portion of the combined signals propagating in the one output path by $\pi/2$ radians;
    a polarizing beam-splitter disposed to receive the combined signals propagating in the first and second output paths from the combining and directing means for coaxially aligning both (a) the first combined signal portion with a first polarization direction propagating in the first output path and (b) the second combined signal portion with a second polarization direction propagating in the second output path into an output beam directed along a predetermined path; and
    a photo detector disposed to receive the coaxially aligned signals in the output beam from the polarizing beam-splitter for independently detecting each of the first and second combined signal portions and generating an output current which is the sum of the two combined signal portions at an output of the mixer.

2. An optical heterodyne mixer according to claim 1 wherein the combining and directing means comprises an optical 3 dB beam-splitter.

3. An optical heterodyne mixer according to claims 1 or 2 wherein the rotating means comprises:
   a $\pi/2$ polarization rotator for rotating the direction of polarization of signals traversing therethrough.

4. An optical heterodyne mixer according to claim 1 wherein the mixer further includes
   redirecting means disposed in one of the output paths comprising a first and a second mirror disposed to, in combination, redirect the associated output path from the combining and directing means to intersect the other output path substantially normal thereto.

5. An optical heterodyne mixer according to claims 1, 2, or 4 wherein signals received at the first and second input terminals each comprise a horizontal polarization direction.

6. An optical heterodyne mixer according to claims 1, 2, or 4 wherein signals received at the first and second input terminals each comprise a vertical polarization direction.

7. An optical heterodyne mixer according to claim 3, wherein signals received at the first and second input terminals each comprise a horizontal polarization direction.

8. An optical heterodyne mixer according to claim 3, wherein signals received at the first and second input terminals each comprise a vertical polarization direction.

* * * * *